Oct. 10, 1939.   C. F. HILL   2,175,893
PROTECTIVE APPARATUS FOR ELECTRICAL DEVICES
Filed June 20, 1936

WITNESSES:

INVENTOR
Charles F. Hill.
BY
ATTORNEY

Patented Oct. 10, 1939

2,175,893

UNITED STATES PATENT OFFICE 2,175,893

PROTECTIVE APPARATUS FOR ELECTRICAL DEVICES

Charles F. Hill, Edgewood, Pa., assignor to Westinghouse Electric & Manufacturing Company, East Pittsburgh, Pa., a corporation of Pennsylvania Application June 20, 1936, Serial No. 86,311

6 Claims. (Cl. 201—76)

The invention relates generally to protective apparatus for electrical systems and more particularly to electrical equipment containing dielectrics which may be decomposed by electric arcs.

The object of the invention is to utilize the chemically reactive characteristics of the gases produced by the decomposition of a dielectric by an electrical arc to effect, through a chemical change in a member of an electric circuit the giving of a warning signal or the performance of a switching operation to isolate the apparatus.

Other objects of the invention will in part be obvious and in part appear hereinafter.

The invention accordingly is disclosed in the accompanying drawing and comprises the features of construction, combination of elements and arrangement of parts which will be exemplified in the structure hereinafter set forth and the scope of the application of which will be indicated in the claims.

For a fuller understanding of the nature and objects of the invention, reference may be had to the following detailed description taken in connection with the accompanying drawing, in which.

The advent of many substantially incombustible dielectrics for use in transformers, regulators and other similar electrical apparatus brought a new problem, that of protecting the apparatus from continued arcing and the prevention of the generation of large volumes of gas. For example, if a dielectric comprising tetrachlorethylbenzene, pentachlorethylbenzene and chlorinated diphenyl oxide is being utilized as a dielectric, and it is decomposed by an electric arc, a certain volume of hydrychloric acid fumes will be evolved. Such fumes should not be allow to escape in any great quantity in sections that are inhabited. While it is possible to utilize absorbers to collect such gases, such methods are not entirely satisfactory, and some provision should be made to indicate an arcing condition in the electrical apparatus and to isolate it from the system and stop the generation of gases. In the present invention, means are provided for both signaling the operating conditions and for actuating the power switches to take the apparatus off the line.

Figure 1:
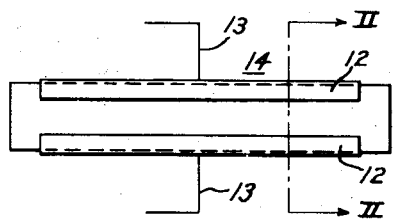
Figure 1 is a view in side elevation of a control element constructed in accordance with the invention.
Figure 2:
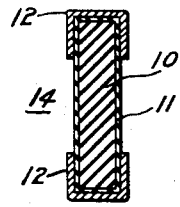
Fig. 2 is an enlarged view in section along the line II—II of Fig. 1.

Referring now to the drawing, and Figs. 1 and 2 in particular, a small rectangular plate 10 of cellulose acetate is shown coated with a metallic hydroxide, such, for example, as iron hydroxide—Fe(OH)₃. In this particular modification, electrodes 12 of some suitable metallic material, such, for example, as aluminum, are clamped on opposite edges of the hydroxide coated plate. Leads 13 are electrically connected to the electrodes 12.

Teh cellulose acetate plate coated with a metallic hydroxide, and its electrodes constitute a control element, which, for convenience in the description to follow, will be referred to as a control member 14. The iron hydroxide employed in this embodiment of the invention is not soluble in water, but is chemically reactive with certain gases.

When the iron hydroxide is dry it has a high ohmic resistance and when connected in an electric circuit practically no electrical current will flow. If it is exposed to hydrochloric acid gas, it reacts forming a solution of ferric chloride, which is a conducting electrolyte. The action which takes place when iron hydroxide is exposed to hydrochloric acid fumes is as follows:

$$Fe(OH)_3 + 3HCl = FeCl_3 + 3H_2O$$

In the making of the present control element, the plate of cellulose acetate has applied thereto a cellulose acetate lacquer which carries an iron hydroxide powder thoroughly mixed with it. The quantity of iron hydroxide powder mixed with the cellulose acetate lacquer may vary greatly, but may readily be determined for the different purposes to which it is to be applied by making a mixture and testing it in its application. If it so hardens and attaches itself to the cellulose acetate plate that it may not readily be scraped off, it is satisfactory for the making of the control elements.

In the process of applying the iron hydroxide mixed with the cellulose acetate lacquer, which is cellulose acetate in solution in acetone, after the painting operation it is allowed to dry. In drying the acetone evaporates and the ferric hydrate remains as a deposit. The particles of the ferric hydrate are bound together and to the plates by the cellulose deposited from the solution.

It has been found that materials other than iron hydroxide may be used successfully. Experiments carried on with strontium hydroxide, potassium hydroxide and barium hydroxide reveals that they may be used successfully. However, these hydroxides are water soluble and are not as desirable as iron hydroxide, since if exposed to water from any source, they will dissolve to some extent.

In the making of tests, a cellulose acetate rectangular plate about 3" long, ¾" wide, and from 1/16" to 1/8" thick was coated with a paint prepared from iron hydroxide in cellulose acetate lacquer. After the paint was dried, it was exposed to a hydrochloric acid gas evolved by the electrical decomposition of a dielectric. The hydrochloric acid attacked the iron hydroxide producing ferric chloride and water. At the start of the experiment when the temperature was 65° C., a current of the order of .1 microampere flowed across the control member or painted cellulose acetate plate. After a few minutes, the current increased from four to five milliamperes or increased to from 40,000 to 50,000 times the initial current.

If in making practical applications higher currents are desired for operating electrical control apparatus, several of the control members may be connected in parallel circuit relation.

Figure 3:
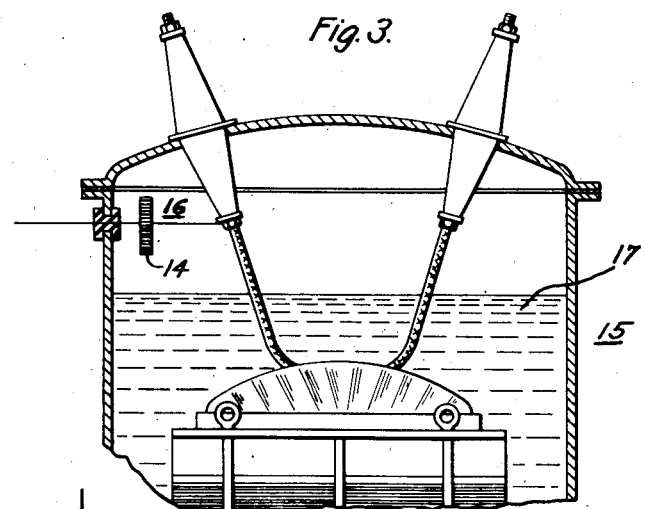
Fig. 3 is a view partly in section and partly in side elevation showing the control element applied to a transformer.

A good illustration of this method of connecting the control elements is illustrated in Fig. 3. As shown, over a dozen control elements 14 connected in parallel circuit relation are connected between the low tension lead of the transformer 15 and ground. This unit, which will be designated generally as 16, is disposed in the space in the transformer above the dielectric 17. If the dielectric is decomposed by an arc, the fumes will envelop the unit 16 causing the decomposition of the iron hydroxide as described hereinbefore.

Figure 4:
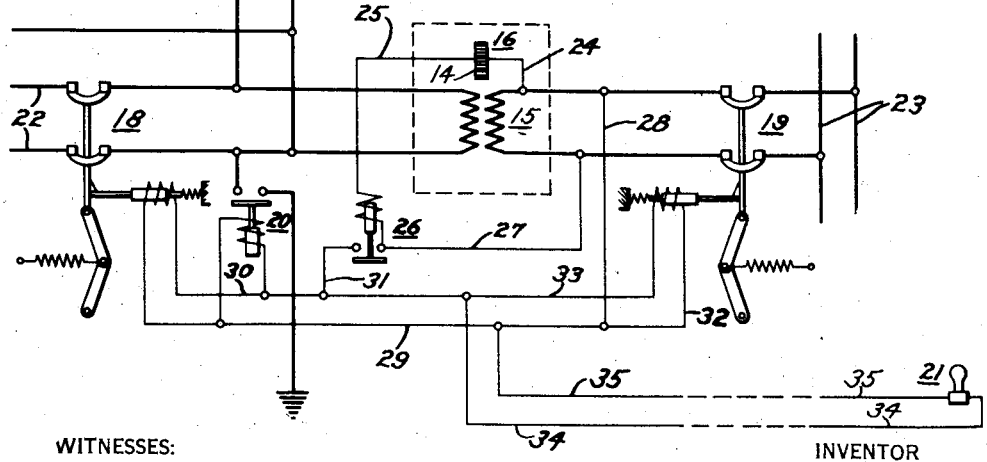
Fig. 4 is a schematic diagram illustrating how the control element may be connected in a circuit to perform its protective function.

The control member may be utilized for any purpose—it may be connected in the circuit of a relay which functions to close a circuit for lighting a signal lamp; it may be utilized for tripping main circuit breakers or network circuit breakers; or it may be employed to ground the line so as to trip out the main breakers between the transformer and the station. In the present instance, the transformer 15 is connected to the line 22 through the main circuit breaker 18 and to the network system 23 through the smaller breaker 19. Relay 20 is provided for connecting the lines to ground in order to cause the heavy flow of current and trip out the main breakers. As shown in the right-hand corner of Fig. 4, a signal lamp 21 is provided. This lamp may be located at a distance from the electrical apparatus to indicate to the operator the condition of the system.

Assuming now that the system is in operation and that a stewing arc develops in the transformer 15, then the hydrochloric acid fumes of the decomposed dielectric will react with the ferric hydroxide establishing an electrolytic cell through which current flows very readily. The circuit may be traced from one side of the low voltage winding of the transformer 15 through conductor 24, the unit of control elements 16, conductor 25, the actuating coil of relay 26, conductor 27 to the other side of the secondary of the transformer. The relay is actuated establishing a number of relay actuating circuits and a signaling circuit.

The actuating circuit for the breaker 18 may be traced from one side of the secondary winding of the transformer through conductors 28 and 29, the actuating coil of the breaker 18, conductors 30 and 31, the relay 26 and conductor 27 back to the other side of the secondary winding of the transformer. The actuating circuit for breaker 19 may be traced from the energized conductor 28 through conductor 32, the actuating coil of breaker 19, conductors 33 and 31 and relay 26 to the conductor 27. The signal circuit extends from the energized conductor 33 through conductor 34, the signal light 21 and conductor 35 back to the energized conductor 29.

From the foregoing it will be evident that any operation may be accomplished through the change of resistance or converting of the resistor unit 16 into an electrolytic conductor. It is further understood that this control member may be utilized with any electrical apparatus using a dielectric which when decomposed gives a gas which reacts with it.

In conclusion, it is pointed out that while the illustrated example constitutes a practical embodiment of my invention, I do not limit myself to the exact details shown since modifications of the same may be considerably varied without departing from the spirit of the invention as defined in the appended claims.

I claim as my invention:

1. In electrical apparatus provided with a dielectric which when decomposed by an electric arc evolves a gas which reacts with a metallic hydroxide, in combination, a member having a high ohmic resistance to the flow of electric current, and a metallic hydroxide also having a high ohmic resistance to the flow of electric current applied to said member, the metallic hydroxide being capable of reacting chemically with the evolved gas thereby producing a material which is a good conductor of electric current.

2. In electrical apparatus provided with a dielectric which when decomposed by an electric arc evolves a gas which reacts with a metallic hydroxide, in combination, a cellulose acetate member, a metallic hydroxide applied to said cellulose acetate member, the cellulose acetate member and metallic hydroxide both having high ohmic resistance to the flow of electric current, the metallic hydroxide being capable of reacting with the evolved gas producing a material which is a good conductor of electric current.

3. In electrical apparatus provided with a dielectric which when decomposed by an electric arc evolves a gas which reacts with a metallic hydroxide, in combination, a cellulose acetate member which constitutes the base, said cellulose acetate member having a high ohmic resistance to the flow of electric current, electrodes applied to the cellulose acetate member in spaced relation, a metallic hydroxide applied to the cellulose acetate member establishing electrical contact between the electrodes, the metallic hydroxide having a high ohmic resistance to the flow of electric current and capable of reacting chemically with the evolved gas to produce a material which is a good conductor.

4. In electrical apparatus provided with a dielectric which when decomposed by an electric arc evolves a gas which reacts with the metallic hydroxide, in combination, a cellulose acetate member having a high ohmic resistance to the flow of electric current, a plurality of electrodes applied to the cellulose acetate member in spaced relation, a hydroxide and a cellulose acetate lacquer mixed together and applied to the cellulose acetate member to establish electrical connection between the electrodes, the cellulose acetate mixture being capable of reacting with the evolved gas to produce a good conductor.

5. In electrical apparatus provided with a dielectric which when decomposed by an electric arc evolves a gas which reacts with a metallic hydroxide, in combination, a cellulose acetate member having a high ohmic resistance to the flow of electric current, a plurality of electrodes applied to the cellulose acetate member in spaced relation, a cellulose acetate lacquer and at least one of the group of metallic hydroxides comprising strontium hydroxide, potassium hydroxide, iron hydroxide and barium hydroxide applied to the cellulose acetate member to establish electrical connection between the electrodes, the metallic hydroxides being capable of reacting with the evolved gas to produce a material which is a good conductor of electricity.

6. In electrical apparatus provided with a dielectric which when decomposed by an electric arc evolves a gas which reacts with a metallic hydroxide, in combination, a cellulose acetate member which has a high ohmic resistance to the flow of electric current, a plurality of electrodes applied to the cellulose acetate member in spaced relation and iron hydroxide applied to the cellulose acetate member to establish electrical connection between the electrodes, the iron hydroxide being capable of reacting with the gas evolved to produce a material which is a good conductor of electric current.

CHARLES F. HILL.